United States Patent
Wallen

[19]

[11] Patent Number: 6,098,467
[45] Date of Patent: Aug. 8, 2000

[54] ACOUSTIC FLOW METER WHEREIN FALSE READINGS ARE IDENTIFIED DEPENDENT ON UPSTREAM AND DOWNSTREAM ACOUSTIC TRANSIT TIMES

[75] Inventor: Lars Wallen, Spanga, Sweden

[73] Assignee: Siemens Elema AB, Solna, Sweden

[21] Appl. No.: 09/210,832

[22] Filed: Dec. 15, 1998

[30] Foreign Application Priority Data

Jan. 15, 1998 [SE] Sweden .................................. 9800074

[51] Int. Cl.$^7$ .................................................. G01F 1/66
[52] U.S. Cl. ........................................................ 73/861.28
[58] Field of Search ............................ 73/861.27, 861.28,
73/861.29, 861.31, 861.18, 861.04, 861.05,
861

[56] References Cited

U.S. PATENT DOCUMENTS

| | | | |
|---|---|---|---|
| 3,818,757 | 6/1974 | Brown | 73/861.27 |
| 3,918,304 | 11/1975 | Abruzzo et al. | . |
| 4,183,244 | 1/1980 | Kohno et al. | . |
| 4,271,708 | 6/1981 | Kohno et al. | . |
| 4,334,431 | 6/1982 | Kohno et al. | 73/861.27 |
| 4,345,479 | 8/1982 | Loveland | . |
| 4,557,148 | 12/1985 | Akiyama | . |
| 4,633,719 | 1/1987 | Vander Heyden | . |
| 5,247,826 | 9/1993 | Frola et al. | . |
| 5,463,906 | 11/1995 | Spani et al. | 73/861.27 |

FOREIGN PATENT DOCUMENTS

WO 94/28790   12/1994   WIPO .

*Primary Examiner*—Max Noori
*Assistant Examiner*—Jagdish Patel
*Attorney, Agent, or Firm*—Hill & Simpson

[57] ABSTRACT

An acoustic fluid flow meter has a timer for determining downstream and upstream transit times values of acoustic pulses transmitted between acoustic signal transceivers, operable alternately as transmitters and receivers, respectively, with and against the direction of fluid flow. Additionally an error signal indicator is supplied with the determined transit time values and emits an error signal indicative of a false flow reading if their sum and/or difference, particularly the sum of derived values, differs from a corresponding control value by a predetermined amount.

10 Claims, 3 Drawing Sheets

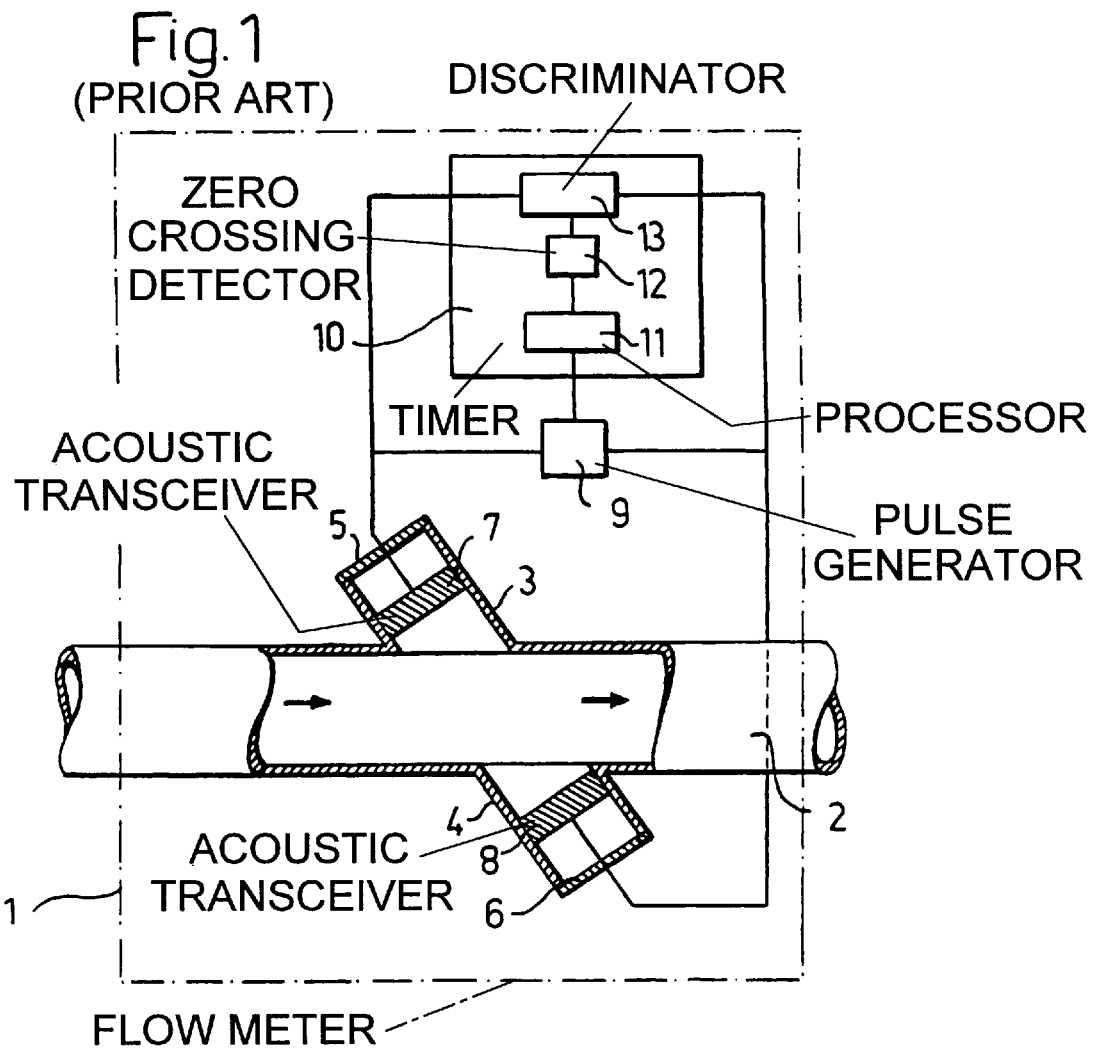
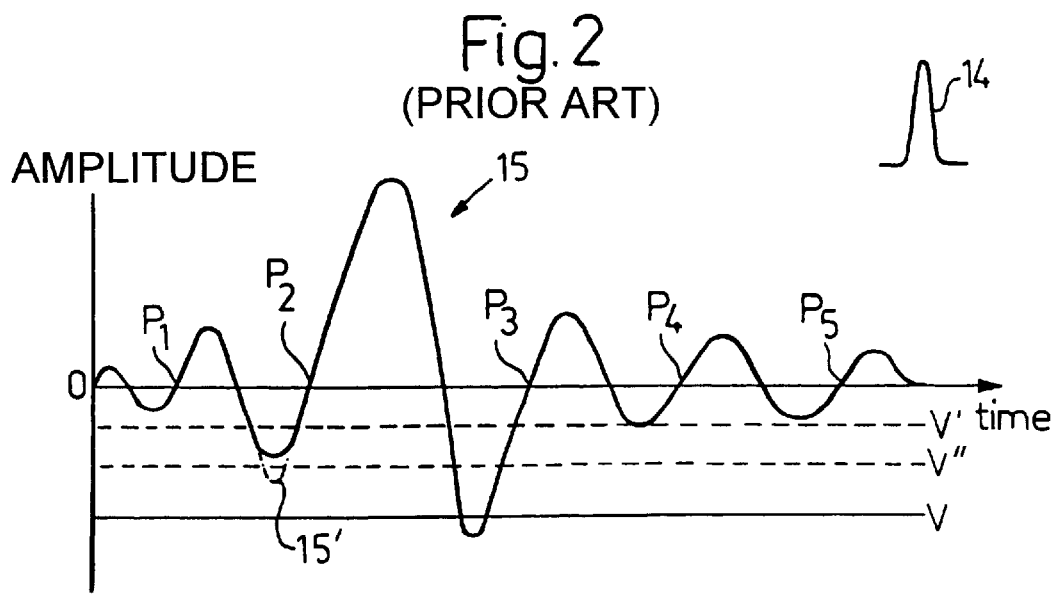

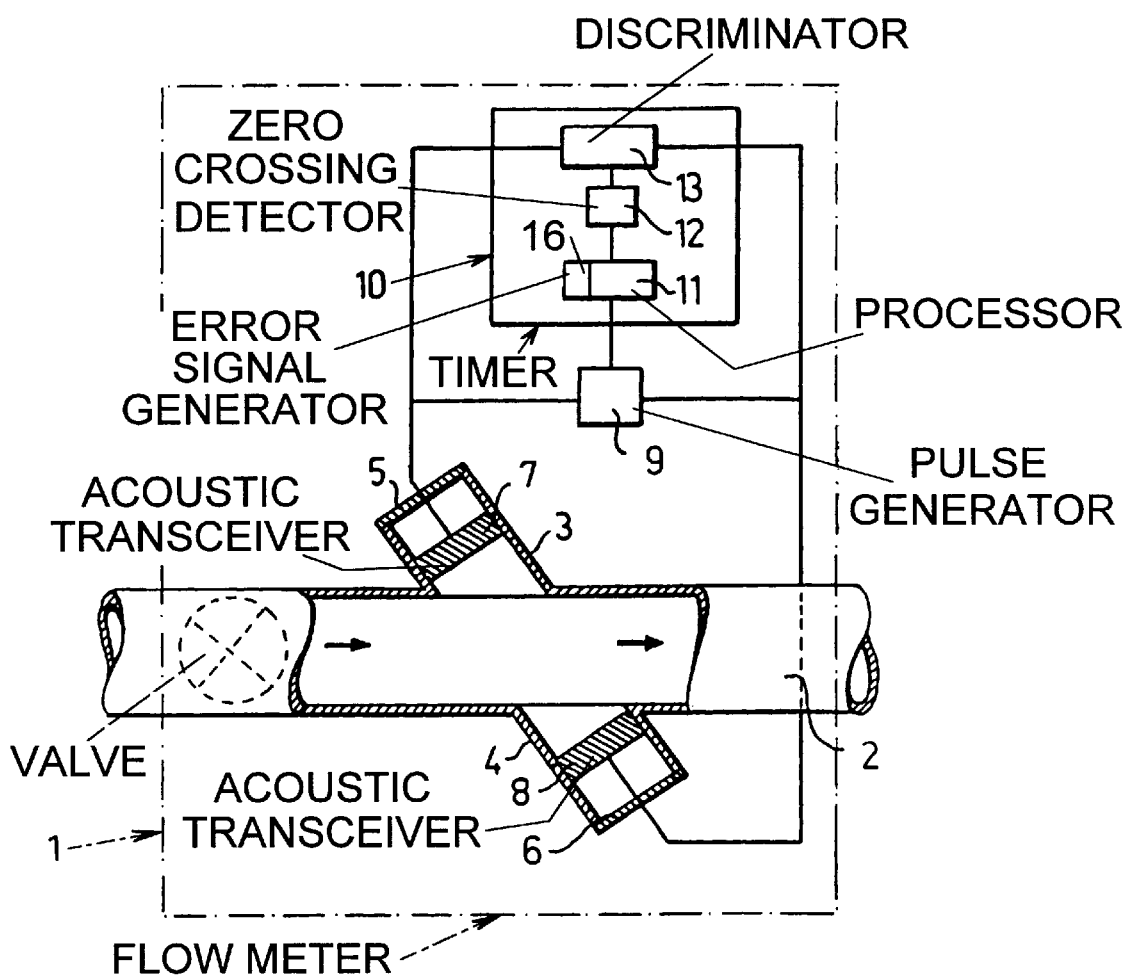

ACOUSTIC FLOW METER WHEREIN FALSE READINGS ARE IDENTIFIED DEPENDENT ON UPSTREAM AND DOWNSTREAM ACOUSTIC TRANSIT TIMES

BACKGROUND OF THE INVENTION

1. Field of the Invention

The present invention relates to an acoustic flow meter and in particular to an ultrasound flow meter useable in the monitoring of gas flow in breathing aid devices such as ventilators or respirators.

2. Description of the Prior Art

Flow meters in which the time of flight of an acoustic (usually ultrasonic) pulse is used to determine the velocity (and hence the flow rate) of the fluid through which the pulse was transmitted are well known in the art. Devices such as those described in PCT Application WO 94/28790 and U.S. Pat. No. 5,247,826, improve on this basic methodology by arranging for the transit times of ultrasonic pulses to be measured both upstream ($T_u$) and downstream ($T_d$) of the fluid flow. These transit times are then supplied to a microprocessor which is set to calculate the fluid flow rate using standard algorithms. A thermometer is also included in both devices to measure the ambient temperature of the fluid. Since the velocity of sound in a medium changes with its temperature a more accurate transit time can be derived with a knowledge of the ambient temperature.

In PCT Application WO 94/28790 a pair of cells, each having a piezoelectric transmitter and receiver, are placed so that an ultrasonic pulse can travel between the cells at an angle to the direction of fluid flow. By having the transmitter in each cell transmit an ultrasonic pulse for reception by the receiver the other cell, both $T_u$ and $T_d$ can be measured. The device described in U.S. Pat. No. 5,247,826 achieves the same result by arranging for a pair of ultrasonic transceivers, which are spaced apart in an elongate coiled tube through which gas can flow, to alternately operate as transmitters and receivers.

A piezoelectric crystal does not emit a single pulse when energized with a single electrical pulse. Rather the crystal is caused to oscillate at a characteristic resonant frequency to emit a "packet" that comprises a number of pulses. The envelope of the transmitter signals decays rapidly with time, usually producing a train of six or so cycles. Thus small errors in the determination of the flow rate may result if the determination is made using different pulses from within the packet.

A problem may therefore arise when conventional devices are used in situations where it is critical to maintain flow rates within fine tolerances, for example in medical applications such as monitoring breathing gas flow rates in ventilators and respirators. In these applications flow meters must be capable of accurately and reliably detecting small changes in gas flow rates. Conventional devices, however, may record small changes which on the face of it look correct but which do not actually result from flow rate changes but rather from registering the arrival time of the wrong acoustic pulse from within a particular packet.

SUMMARY OF THE INVENTION

It is an object of the present invention to provide an acoustic flow meter in which such erroneous flow rates can be automatically identified.

This object is achieved by a flow meter wherein an error signal indicator receives the measured transit times $T_u$ and $T_d$ and compares a derived value (that is, their sum or their difference) with corresponding control values and, if their difference exceeds a corresponding predetermined threshold value, emits an error signal. This error signal may be subsequently used, for example, to vary operating parameters of the flow meter to avoid such errors, to instruct circuitry to ignore the reading, or to provide a detectable warning to an operator so that corrective measures can be manually implemented.

Especially when the flow meter is to measure continuous flows, the error signal indicator can include circuitry to form the sum of the transit times $T_u$ and $T_d$ (which sum, because the fluid flow rate has equal but opposite effects on the transit times, should be constant for any flow rate), to compare it to a control value dependent on the expected sum, which may be a measured value or a calculated value (calculated for example by using the well known equation for the speed of sound in an ideal gas provided that the temperature and the composition of the gas is known), to emit an error signal should the difference between the formed value and the control value exceed a predetermined threshold, which may be 0. In this way the flow meter can be continuously monitored for erroneous signals.

The circuitry may, for example, be configured to measure the difference between the formed sum and a control value consisting of a previously formed sum and may additionally be adapted to replace the control value with the formed sum if the difference does not exceed the predetermined threshold, to thereby update the control value.

Preferably, the error signal indicator forms the control value from transit times measured during substantially laminar fluid flow conditions, for example at zero or low flow rates, thus allowing the flow meter to be made self-calibrating. Preferably, the self-calibration is performed periodically throughout the operation of the flow meter to provide self-compensation for changes in the velocity of the ultrasound caused by changes in ambient conditions, such as temperature, or in the condition of the timer. This has the further advantage that the construction of the flow meter may be simplified since additional components, such as a thermometer, that are employed to monitor the ambient conditions need not be included in the flow meter.

Additionally or alternatively the error signal indicator may include circuitry to form the difference of the transit times $T_u$ and $T_d$, to compare it to a control value dependent on the expected or a measured difference and to emit an error signal should the difference between the control value and the formed value exceed a predetermined threshold.

As will be appreciated by those skilled in the art, formed difference values, unlike formed sum values, will be dependent on and change as the flow rate changes. However, such error monitoring may be used at times when there is a known or zero flow or by arranging the circuitry to utilize a previously formed difference value as a control value, and by replacing the control value with new formed values so that the time between determining the control and formed values is less than the measurable changes in the flow rate.

DESCRIPTION OF THE DRAWINGS

FIG. 1 is a schematic representation of a known flow meter.

FIG. 2 illustrates a commonly used mode of operating the known flow meter of FIG. 1.

FIG. 3 illustrates a flow meter according to the present invention.

DESCRIPTION OF THE PREFERRED EMBODIMENTS

Figure 4:
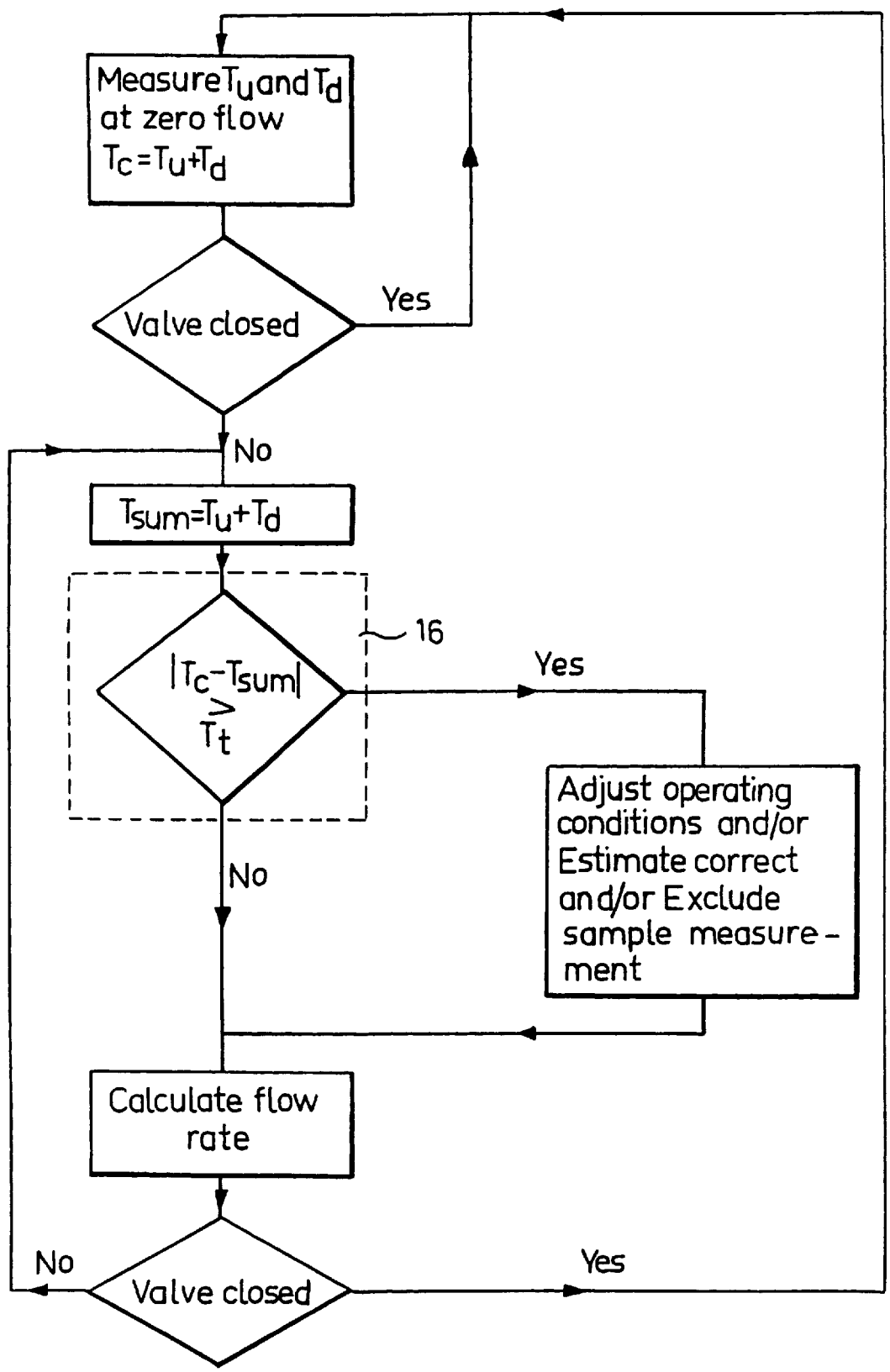
FIG. 4 shows a logic flow diagram of an exemplary mode of operating the flow meter according to the present invention.

To better understand the present invention a known flow meter will first be described. Considering FIG. 1, a flow meter 1 has a tube 2 through which a fluid can flow, for example in the direction of the arrows. Branches 3,4 are formed with respective fluid tight ends 5,6 in the tube 2 and respective piezoelectric transceivers 7,8 are placed in the branches 3,4 so that acoustic pulses emitted from one transceiver 7,8 can cross the path of the fluid flow at an angle to be received at the other transceiver 8,7. An electrical pulse generator 9 and timer 10, which can be formed by a suitably programmed microprocessor 11 operating with a known internal clock frequency, are connected to each other and to each of the piezoelectric transceivers 7,8 such that each transceiver 7,8 can be operated in turn as a transmitter and as a receiver. The connections between the pulse generator 9, the timer 10 and each of the transceivers 7,8 are switchable such that when the pulse generator 9 is switched to supply electrical pulses to the transceiver 7, the timer 10 is switched to receive electrical signals only from the transceiver 8, and vice versa.

Further description of the operation of the flow meter 1 will be, for simplicity, made for a state where the transceiver 7 is set to act as a transmitter and the transceiver 8 is set to act as a receiver.

The pulse generator 9 supplies a single electrical pulse 14, shown generally by the inset of FIG. 2, to the piezoelectric transmitter 7 and provides a signal to the microprocessor 11 of the timer 10 to begin counting pulses from its internal clock. This electrical pulse 14 causes the transmitter 7 to emit a wave train 15 which has zero amplitude crossings at $P_{1-5}$, as shown in FIG. 2. This wave train 15 passes through the fluid in tube 2, at an angle to the direction of fluid flow, and is received at the piezoelectric receiver 8 where it causes an electrical wave train 15 to be generated with analogous voltage amplitude variations. This electrical signal is supplied as an input to the timer 10.

The timer 10 also includes a zero crossing detector 12, well known in the art, to detect voltage zero crossings $P_{1-5}$ and is configured to always determine the same voltage zero crossing (for example $P_3$) associated with the electrical pulse 14. On detecting this single zero crossing, a signal is transmitted to the processor 11 which interrupts the clock pulse count. From a knowledge of the internal clock frequency of the processor 11 and the number of counted clock pulses between the generation and receipt of the ultrasonic signal, the processor 11 can be programmed to calculate the transit time of the ultrasonic pulses. When fluid flows through the tube 2 in the direction shown in FIG. 1, then with the transceiver 7 acting as a transmitter and the transceiver 8 acting as a receiver, the downstream transit time $T_d$ will be determined by the timer 10.

When the roles of the transceivers 7,8 are reversed then the slower, upstream transit time $T_u$ can be similarly determined. The processor 11 of the timer 10 is further programmed to determine the fluid flow rate from $T_u$ and $T_d$ and by using an equation well known to those knowledgeable in the physics of sound propagation as exemplified in U.S. Pat. No. 5,247,826 and which may be expressed as:

$$V = K(T_u - T_d)/(T_u + T_d)^2 \quad (1)$$

wherein V is the bulk flow rate and K is a constant dependent on, inter alia, physical dimensions of the flow meter 1 and which may be calculated or determined experimentally without undue effort.

Clearly, each electrical pulse 14 provides a received signal 15 having a number of voltage zero crossing points $P_{1-5}$. While it is intended to use only a single crossing point, for example $P_3$, for each electrical pulse any of the zero crossing points $P_{1-5}$ could be registered, which would lead to errors in the determination of the transit time values $T_u - T_d$ and hence errors in the calculated flow rate can result.

In an attempt to remove this problem it is known to include in the flow meter 1 a discriminator 13, for example at the input stage of the timer 10, to prevent registering any crossing point but, for example, $P_3$. Referring to FIG. 2, the zero crossing detector 12 and the discriminator 13 co-operate generally by looking for a zero crossing in which the signal 15 goes from negative to positive (or positive to negative) but only after the signal 15 has fallen below (above) a preset threshold voltage V. In this way all but the crossing $P_3$ can be rejected. Measurement errors, however, may still occur. For example if the threshold voltage is set too low (V') it may be possible to register one of several zero crossing points $P_{2,3}$. Even if the voltage is set to a correct level, such as V" variations 15' in amplitude of the signal 15, for example caused by noise or time dependent changes in the operational characteristics of the transceivers 7,8, could still mean that it is possible to detect one of several zero crossing points $P_{2-3}$.

A flow meter 1 according to the present invention is shown in FIG. 3 and, to the extent it is similar to that of the known flow meter of FIG. 1, is shown with common components having the same numbering as FIG. 1. Upstream and downstream transit times, $T_u$ and $T_d$ respectively are determined as previously described and are entered into the microprocessor 11 of the timer 10. Differing from the previously described known flow meter, an error signal indicator 16 is included within the timer 10 as part of the programmed microprocessor 11, which operates according to the logic flow chart shown in FIG. 4.

In use the error signal indicator 16 makes the determination of a false transit time reading based on the summation of $T_u$ and $T_d$, namely $T_{sum}$. The microprocessor 11 holds in memory a control value, $T_c$, which is a summed transit time value formed at zero (or low flow producing laminar flow) flow. This can be obtained at start up before fluid flows through the meter 1, or may be obtained when a flow control valve 17 (here shown as part of the meter 1 but which could be in the fluid system outside the flow meter 1) is closed to prevent fluid flowing in the meter 1, or may be obtained during periods when it is known that no fluid will be flowing through the meter 1. This last option may be preferred, for example when the meter 1 is used in breathing assist systems, such as in the expiration or inspiration sides of known ventilator systems, where by the very nature of the breathing process there will be periods when no fluid flows in one or other of the sides. Additionally, the control value $T_c$ may be updated from new summations made at the zero flow condition or from measured values of $T_{sum}$ obtained when the error signal indicator 16 indicates that accurate transit time values were collected.

The flow meter 1 operates in a manner previously described in connection with FIG. 1 to obtain instantaneous values of $T_u$ and $T_d$. The error signal indicator 16 forms a value of $T_{sum}$ using these instantaneous values and compares it with the control value $T_c$ to determine the absolute value of $T_c - T_{sum}$. If this absolute value is greater than a preset threshold value $T_t$, which may be set at zero, then an error signal is generated by the error signal indicator 16 of the processor 11. This signal may then be used in ways apparent to those skilled in the art, for example to inhibit a flow rate reading from being made, or for varying operating parameters of the device to which the flow meter is connected to adjust the flow rate, or for initiating correction algorithms within the flow meter to generate an estimated flow value, perhaps based on trends in the flow rate from previously calculate "good" flow rate measurements. If no error signal is generated, the processor 11 then calculates the flow rate using equation (1). A detectable representation of this flow rate can then made, for example as an output on a computer screen or a dial.

It will be appreciated by those skilled in the art that a flow meter according to the present invention as described above with the aid of FIG. 4 could easily be modified to make error determinations based on the difference $T_{diff}$ between $T_u$ and $T_d$. In this case $T_c$ would be, for example, $T_d$-$T_u$ and the error signal generator 16 would operate to determine whether $|T_c$-$T_{diff}|$ exceeds a set amount.

Although modifications and changes may be suggested by those skilled in the art, it is the intention of the inventor to embody within the patent warranted hereon all changes and modifications as reasonably and properly come within the scope of his contribution to the art.

I claim as my invention:

1. An acoustic fluid flow meter comprising;
   an acoustic transmitter and receiver arrangement disposed relative to a flowing medium, said acoustic transmitter and receiver arrangement including a first element acting as a first transmitter and a first receiver operable alternately, said first transmitter emitting downstream acoustic pulses into said flowing medium, propagating downstream relative to said flowing medium, and said first receiver receiving said downstream acoustic pulses after propagation through said flowing medium, and second element acting as a second transmitter and a second receiver operable alternately, said second transmitter emitting upstream acoustic pulses into said flowing medium, propagating upstream relative to said flowing medium, and said second receiver receiving said upstream acoustic pulses after propagation through said flowing medium, said acoustic transmitter and receiver arrangement emitting respective signals into said flowing medium, the respective signals identifying when said downstream acoustic pulses are emitted, when said downstream acoustic pulses are received, when said upstream acoustic pulses are emitted and when said upstream acoustic pulses are received;
   a timer connected to said acoustic transmitter and receiver arrangement, said timer measuring a downstream transit time of said downstream acoustic pulses and an upstream transit time of said upstream acoustic pulses from the respective signals; and
   an error signal indicator in said timer, supplied with said downstream transit time and said upstream transit time, said error signal indicator deriving a derived value from said downstream transit time and said upstream transit time and emitting an error signal indicating a false flow reading when said derived value differs from a control value by a predetermined amount.

2. An acoustic fluid flow meter as claimed in claim 1 wherein said first element is a first acoustic transceiver alternatingly operable as said first transmitter of said downstream acoustic pulses and as said first receiver of said upstream acoustic pulses, and said second element is a second acoustic transceiver, alternatingly operable as the second receiver of said downstream acoustic pulses, when said first transceiver is operated as said first transmitter, and as the second transmitter of said upstream acoustic pulses, when said first transceiver is operated as the first receiver.

3. A fluid flow meter as claimed in claim 2 wherein said timer includes means for processing said control value from a downstream transit time and an upstream transit time obtained during a laminar flow of said flowing medium.

4. A fluid flow meter as claimed in claim 2 wherein said timer includes means for processing said control value from a downstream transit time and an upstream transit time obtained when said flowing medium has a substantially zero flow rate.

5. A fluid flow meter as claimed in claim 1 wherein said error signal indicator forms a sum of said upstream transit time and said downstream transit time as said derived value.

6. A fluid flow meter as claimed in claim 1 wherein said error signal indicator forms a difference between said downstream transit time and said upstream transit time as said derived value.

7. A fluid flow meter as claimed in claim 6 wherein said error signal indicator emits said error signal when said difference exceeds the control value.

8. A fluid flow meter as claimed in claim 1 further comprising a valve disposed relative to said acoustic transmitter and receiver arrangement for controlling a flow of said flowing medium past said acoustic transmitter and receiver arrangement.

9. A fluid flow meter as claimed in claim 1 wherein said upstream transit time and said downstream transit time are currently-obtained values, and wherein said timer includes a processor, said processor including means for determining previous upstream and downstream transit times determined by the timer, preceding said current values, means for storing said previous upstream and downstream transit times, and means for periodically updating said control value dependent on said previous upstream and downstream transit times.

10. A fluid flow system comprising:
    a conduit through which a fluid flows;
    an acoustic transmitter and receiver arrangement connected to said conduit and acoustically coupled to said fluid in said conduit, said acoustic transmitter and receiver arrangement including a first element acting as a first transmitter and a first receiver operable alternately, said first transmitter emitting downstream acoustic pulses into said fluid, propagating downstream relative to said fluid, and said first receiver receiving said downstream acoustic pulses after propagation through said fluid, and a second element acting as a second transmitter and a second receiver operable alternately, said second transmitter emitting upstream acoustic pulses into said fluid, propagating upstream relative to said fluid, and said second receiver receiving said upstream acoustic pulses after propagation through said fluid, said acoustic transmitter and receiver arrangement emitting respective signals into said fluid, said respective signals identifying when said downstream acoustic pulses are emitted, when said downstream acoustic pulses are received, when said upstream acoustic pulses are emitted and when said upstream acoustic pulses are received;
    a timer connected to said acoustic transmitter and receiver arrangement said timer measuring a downstream transit time of said downstream acoustic pulses and an upstream transit time of said upstream acoustic pulses from said respective signals; and
    an error signal indicator in said timer, supplied with said downstream transit time and said upstream transit time, said error signal indicator deriving a derived value from said downstream transit time and said upstream transit time and emitting an error signal indicating a false flow reading when said derived value differs from a control value by a predetermined amount.

* * * * *